Figure 5:
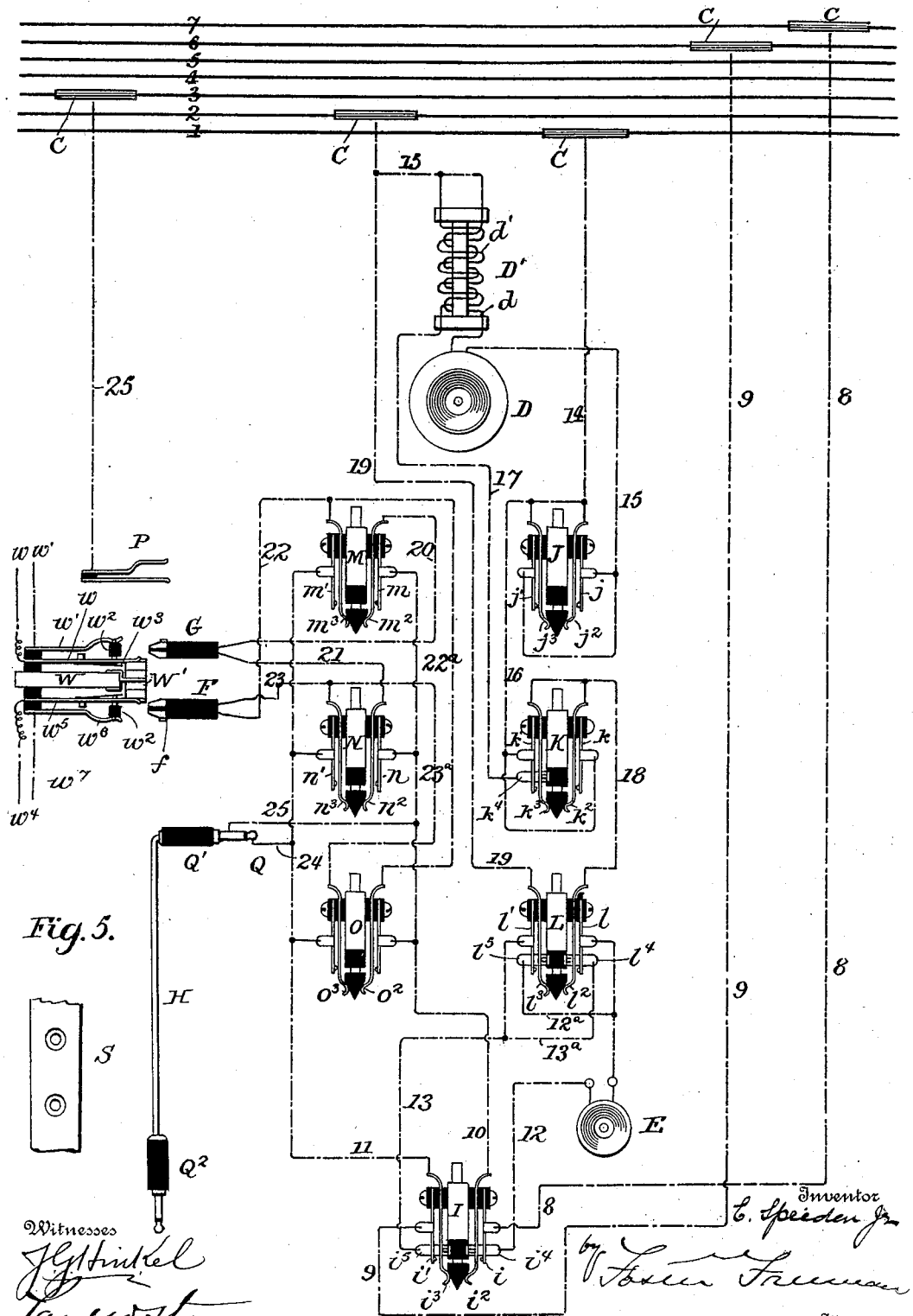

No. 616,983.  
E. SPEIDEN, Jr.  
TRAVELING TEST APPARATUS.  
(Application filed Dec. 6, 1897.)  
(No Model.)  
Patented Jan. 3, 1899.  
3 Sheets—Sheet 1.
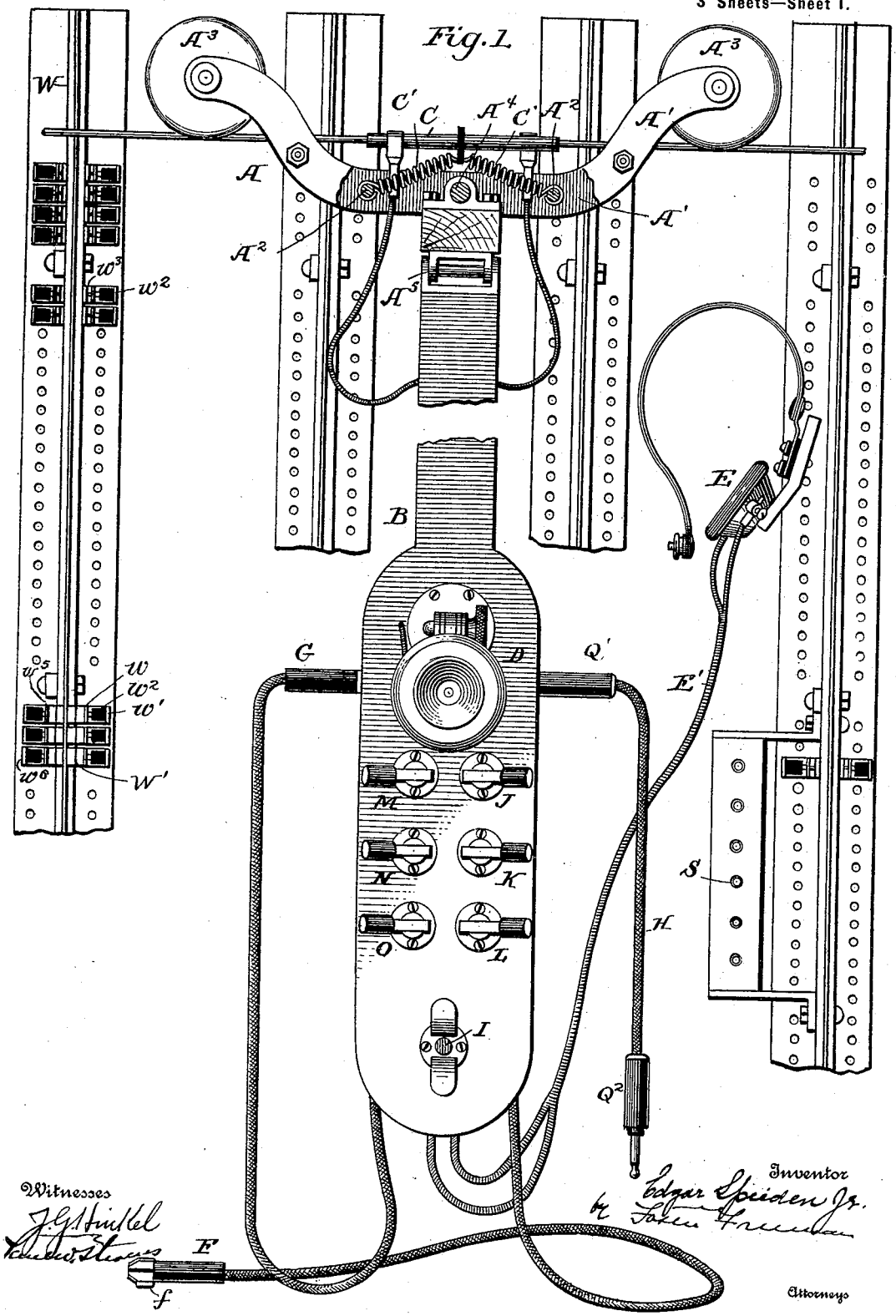

No. 616,983. Patented Jan. 3, 1899.
E. SPEIDEN, Jr.
TRAVELING TEST APPARATUS.
(Application filed Dec. 6, 1897.)
(No Model.) 3 Sheets—Sheet 2.
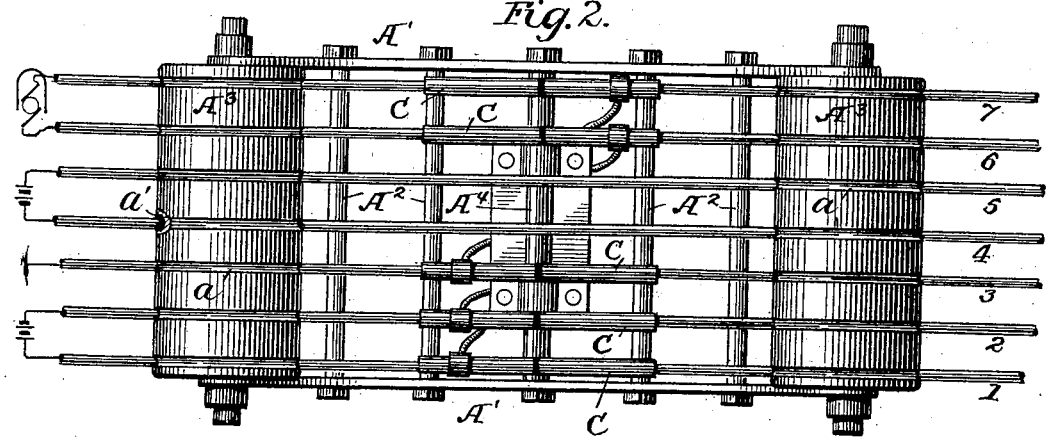
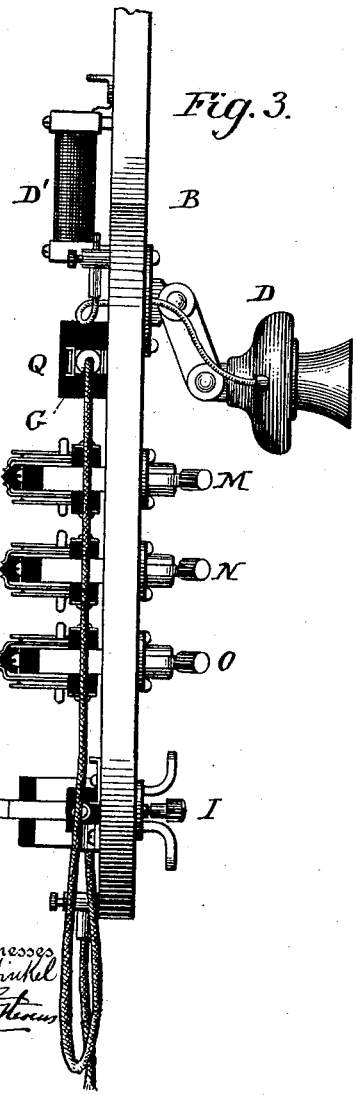
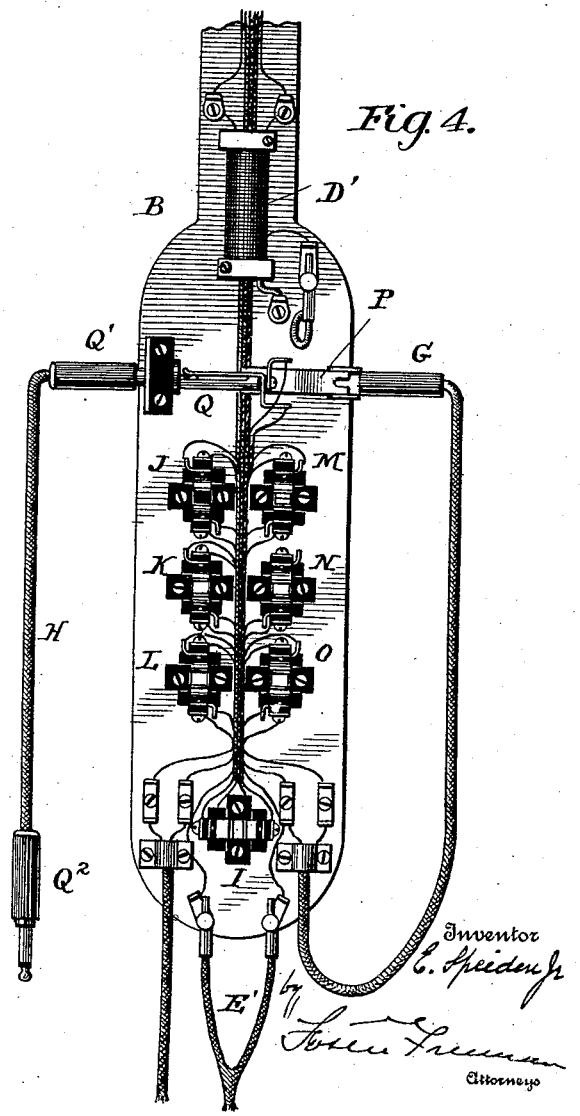

No. 616,983. Patented Jan. 3, 1899.
E. SPEIDEN, Jr.
TRAVELING TEST APPARATUS.
(Application filed Dec. 6, 1897.)
(No Model.) 3 Sheets—Sheet 3.

UNITED STATES PATENT OFFICE.

EDGAR SPEIDEN, JR., OF WASHINGTON, DISTRICT OF COLUMBIA.

TRAVELING TEST APPARATUS.

SPECIFICATION forming part of Letters Patent No. 616,983, dated January 3, 1899.

Application filed December 6, 1897. Serial No. 660,895. (No model.)

*To all whom it may concern:*

Be it known that I, EDGAR SPEIDEN, Jr., a citizen of the United States, residing at Washington, in the District of Columbia, have invented certain new and useful Improvements in Traveling Test Apparatus, of which the following is a specification.

My invention relates to a traveling testing apparatus for electric circuits; and it has for its object to provide a testing apparatus which is adapted to travel with relation to the terminals of electric circuits, to receive current when so traveling, and to carry testing devices whereby the circuits can be readily tested; and to these ends it consists in the apparatus embodying the features of construction and arrangement and having the mode of operation substantially as hereinafter more particularly set forth.

In the accompanying drawings, Figure 1 is an elevation showing the general construction and arrangement of the preferred embodiment of my invention. Fig. 2 is a plan view of the way and carrier. Fig. 3 is an edge view of the keyboard. Fig. 4 is a rear view thereof, and Fig. 5 is a diagrammatic representation of the circuits and connections.

It is well known that in the use of many electric circuits it becomes necessary to test the various lines to ascertain their condition and detect faults therein, and especially is this so in connection with central offices of telephone-lines, where there are a great many circuits terminating within a comparatively small space, and it is desirable to have apparatus whereby any one of the numerous lines can be quickly and easily connected to a testing apparatus, so that its condition can be ascertained; and it is one of the objects of my invention to provide a traveling testing apparatus adapted to be arranged adjacent the terminals of a series of circuits, so that it can be brought in juxtaposition to any one of the terminals and connections made therewith. Such a testing apparatus must be provided with current in all positions of use; and another feature of my invention consists in the means whereby the testing apparatus is electrically connected with the source or sources of electric current to energize the testing devices. It is further necessary in making these tests to be able to connect with and disconnect the testing apparatus from the circuits; and another feature of my invention includes the connections whereby this can be done. Not only must connection be made between the battery and circuits including the testing apparatus, but devices must be provided whereby different conditions of current can be supplied to the circuits; and my invention embodies a traveling testing apparatus carrying the necessary testing instruments and connections whereby the instruments may be included in circuit in various ways. These general features of the apparatus may be embodied in different structures and combined in different ways, and while I will now describe, in connection with the annexed drawings, one preferred embodiment of my invention it will be understood that the invention is not limited to the details of construction and arrangement of parts, but that they may be varied to suit the requirements of any particular case without departing from the general principles of the invention.

To illustrate the invention, I have shown the traveling testing apparatus arranged in connection with a series of telephone-circuits, and, as is well known, these circuits are usually brought together in a room and arranged in regular order and are usually provided with terminals the branches of which lead to the switchboards and to the subscribers' circuits, respectively. These terminals are usually provided with some safety devices to protect the circuits and office instruments from the effects of heavy currents, and I have indicated one such form of device, which is usually known in the art as the "Hayes" protector. It will be understood that it is not necessary to my invention to use such a device as this, as any means whereby connection can be made with the circuits will subserve the purpose. This construction is only illustrated as typical, being one in common use and well adapted for a large number of circuits.

It is sufficient to an understanding of this device to say that it comprises a number of metal bars W, which are connected to the ground, and to which bars are attached the terminals of the outside or line circuit and the switchboard-circuit in any desired way. In Figs. 1 and 5 I have shown $w$ as being one of the line-terminals and $w'$ one of the switchboard-terminals, and between these terminals is usually placed a safety or heat coil $w^2$, which controls a normally open spring-contact $w^3$, but which is so arranged that when an excessive current passes through the heat-coil the contact $w^3$ is forced against the bar W, making a direct ground connection for the circuit.

So far I have only described the use of this device for a grounded or single-wire circuit. When it is used in connection with metallic circuits, the other terminal $w^4$ of the outside line is connected to the plate $w^5$, while the other switchboard-terminal $w^7$ is connected to the spring-plate $w^6$, and there is another safety heat-coil $w^2$ arranged in similar relation between these terminals.

The device is also usually provided with a lightning-arrester W', the construction of which is immaterial for my purpose.

It will be seen that by removing the safety heat-coils $w^2$ an open terminal to both the outside line-circuit $w$ and the switchboard-circuit $w'$ is furnished, and I preferably take advantage of this to insert the test-plug of my traveling testing apparatus. It will be understood that in this class of devices there may be thousands of lines arranged on the various bars W, and I arrange my traveling testing apparatus so that it can be moved in juxtaposition with any of the circuits, so that connection can be readily made therewith, and at the same time the testing apparatus will be furnished with the proper currents and connections to energize the testing devices. This Hayes protector or some similar device is usually arranged in connection with or mounted on the circuit-distributing frame, and in the present instance I have shown as arranged in front of the protectors and supported in any desired way, by the distributing-frame or otherwise, a series of conductors 1 2 3 4 5 6 7. These conductors not only serve to furnish the desired current for testing, but are arranged to form a traveling way, on which the traveling testing apparatus is mounted so that it can be moved to various positions and in all positions receive the necessary currents to accomplish the testing. In the present instance the conductors 1 and 2 may be connected with a battery to furnish the current for the transmitter and testing devices on the test apparatus. The conductor 3 in the present instance is permanently connected with the ground. Conductors 4 and 5 may also be connected to a battery to supply current to another test apparatus mounted on the same way, and of course there may be more conductors like 1 and 2 or 4 and 5, according to the number of test apparatuses traveling on the way. Conductors 6 and 7 are connected with the source of current for signaling purposes, which may be in the form of a battery or magneto-generator or otherwise. It is evident that if occasion required there could be any number of conductors thus arranged to form the way and furnish current for any devices used in testing—as, for instance, there might be conductors connected to a condenser or other testing device; but it is not deemed necessary to show such circuits in order to properly explain my invention.

While I have shown and prefer that the way should be composed, partly, at least, of the conductors, it is evident that some of the rods or wires may constitute the actual supporting-way, while the conductors may be arranged adjacent thereto, and in fact there may be a mechanical way of other than conducting material, which shall support the carrier, so that electric connections can be made from the carrier to the conductors; but it is not deemed necessary to illustrate such a construction.

The testing apparatus comprises a carrier A, adapted to travel on the way, and while this may be variously constructed I have shown it as comprised of a frame having side pieces A' and transverse connecting-pieces $A^2$, and mounted in the frame are the rollers $A^3$, bearing on the way and supporting the testing apparatus. These rollers may be constructed in any suitable manner, and when they travel on the conductors themselves they are of insulating material and are preferably grooved, as at $a$, to better retain the carrier on the way. These grooves, however, are not essential, as other well-known means of retaining the carrier on the way may be adopted. Of course the body of the wheels or rollers $A^3$ may be of conducting material covered with a non-conducting surface, as felt or rubber, and I have found it advantageous to supply the grooves $a$ with a lining of rubber $a'$, as this tends to avoid noise or disturbance.

Connected to the traveling carrier A is a support B of any suitable shape and preferably of non-conducting material, and this support is preferably connected to the carrier by a universal joint, and in the present instance I have shown it as mounted on a rod $A^4$, so as to swing laterally and having a swinging connection $A^5$, so as to swing backward and forward; but any other connection, such as a ball-and-socket joint or even a rigid connection, may be used. On this support or keyboard B are mounted the necessary testing devices, which may vary according to the requirements of any particular case.

In making tests it is necessary to have a good electric connection between the test devices on the keyboard and the conductors on the way, and this of course must be a traveling connection or contact, and while this may be accomplished in various ways I have shown a very simple and yet effectual construction comprising conducting-tubes C, mounted on the conductors and sliding thereon, to which the terminals of the connecting cords or wires leading to the testing devices are secured.

In order to maintain contact, I cause the conducting-tubes to bear on the conductors with a spring-pressure, and have shown a double spring C' connected to each conducting-tube C, but insulated therefrom, and the terminals of the springs are connected to the frame in any suitably way, as to the transverse connecting-pieces A². This double spring C' not only exerts a continual downward pressure to insure good contact between the conducting-tubes and conductors, but when the carrier is moved in one direction or the other one or the other of the branches of the spring may yield somewhat until its tension overcomes the friction between the tube and conductor, and this insures a good continuous rubbing contact between the tube and conductor. The conducting cords or wires leading from the conducting-tubes to the various testing devices are preferably bunched in the usual way, as indicated in Fig. 4, their terminals being connected to the different devices, as indicated, so as to connect them with the different conductors of the way.

While different testing devices may be used for different purposes, I have shown as mounted on the keyboard or support B the necessary testing devices commonly used in testing telephone-circuits. These consist, essentially, of a transmitting-telephone D and an induction-coil D', also a receiving-telephone E, which is preferably provided with the usual appliances for supporting it upon the head of the operator and with the connecting-cords E', leading to the terminals on the keyboard, as will hereinafter be explained.

Electrically connected by flexible conductors to the keyboard B are the test-plugs F and G and double plug-conductor H, the use of which will be explained hereinafter. Also mounted on the keyboard is a ringing-key I, as well as a number of other keys or switches J K L M N O, arranged to control the circuits in a manner hereinafter set forth. These keys or switches may be variously constructed, and I have indicated a well-known form of double contact-switches generally used in telephone-switchboards, and do not deem it necessary to describe in detail their construction. There is also mounted on the keyboard a spring-jack P, which is permanently connected with the ground-conductor 3 of the way, and I have also shown another spring-jack Q, which is adapted to receive a plug Q', connected to another similar plug Q² by a flexible conductor H. It will thus be seen that the traveling test apparatus carries upon itself all the necessary keys and instruments to make the usual tests in connection with telephone-circuits, and these are in constant electric connection with the conductors of the way regardless of the position of the carrier supporting the instruments.

When it is desired to test any particular circuit on the distributing-frames, the traveling carrier can be moved longitudinally on the way to a position adjacent to the terminals of the particular line to be tested and the test plug or plugs applied to the line, and then by manipulating the various keys or switches different circuits are completed through the testing instruments with different kinds of current ordinarily used in detecting faults, and when the test of this line is completed the carrier can be moved to any other position adjacent to another line, and by these movements the electrical connection with the source of supply of current is thoroughly and perfectly maintained through the traveling conducting-tubes on the conductors of the way.

In order that the use of the apparatus may be better understood, reference is made to the diagram Fig. 5, in which the circuits are displayed with indications of the various testing devices.

It will be premised that the keys or switches J K L control the battery-circuit, while the keys or switches M N O control the relations of the secondary circuit of the telephone to the plugs, and thence to the lines to be tested, while the switch or key I controls the signaling-circuit. The keys or switches, as shown, comprise, generally stated, a number of contact devices, with a movable plunger or plug for controlling the contact devices. The outside springs are connected to circuits and are normally open, while the movable springs, which are moved on depressing the plunger, make and break contact with the outside springs. Some of the keys also have what I have termed "normal contacts"—that is, contacts engaging the movable springs when the keys are in their normal condition. As before stated, any other style of key or switch can be used and the circuits arranged according to the requirements of any particular case; but I will now describe the arrangement of circuits with the style of keys indicated. The outside springs $i$ $i'$ of the signal-key I are respectively connected through conductors 8 and 9 with the conductors 7 and 6 of the way, while the movable springs $i^2$ $i^3$ are connected to conductors 10 and 11, which in turn are connected to the outside springs of the switches M N O. There are also normal contacts $i^4$ $i^5$ connected by conductors 12 13 through the operator's receiver E to the outside springs $l$ $l'$ of the battery-reversing key L, while leading from each of these conductors is a branch 12ª 13ª, connected to the normal contacts $l^4$ $l^5$, against which contacts the movable springs $l^2$ $l^3$ normally bear. The local-battery key J is connected on one side by the wire 14 with the conductor 1 of the way, this wire 14 being connected to both of the movable springs $j^2 j^3$, while leading from the outside springs $j j'$ is a conductor 15, passing through the transmitter D, thence through the primary coil $d$ of the inductorium D', and thence to the conductor 2 of the way. The testing-battery key K is also connected to the conductor 1 of the way through the conductor 14, the conductor 16, which is connected to both of the outside springs $k\,k'$ of the testing-battery key. There is a normal contact $k^4$, connected by conductor 17, through the secondary circuit $d'$ of the inductorium $D'$, to the conductor 15. The movable springs $k^2\,k^3$ are connected together and to the conductor 18, leading to the movable spring $l^2$ of the battery-reversing key L and normally bearing on the contact $l^4$, and the movable spring $l^3$, connected by conductor 19 to the conductor 2 of the way, normally bears on contact $l^5$. It may be remarked here that the battery-reversing key does not in either position open the circuit, but simply changes the direction of the current through the operator's receiving-telephone, as well as through the connections hereinafter described. The movable spring $m^2$ of the switchboard-testing key M is connected by conductor 20 to the switchboard side of the testing-plug G, while the line side is connected by conductor 21 to the movable spring $n^2$ of the line-testing key N. The movable spring $m^3$ of the switchboard-testing key M is connected by conductor 22 to the switchboard side of the test-plug F, while the line side of said plug is connected by conductor 23 to the movable spring $n^3$ of the key N. It will also be seen that the line side of the plug F is connected through the conductor 23 and extension $23^a$ to the movable spring $o^3$ of the looping-in key O, while the switchboard side is connected through the conductor 22 and the extension $22^a$ to the movable spring $o^2$ of the looping-in key. The spring-jack Q for the reception of the double plug Q' is connected between the conductors 10 11 by the conductors 24 25. The grounded spring P is connected by conductor 25 to the ground conductor 3 of the way. With this arrangement of circuits a great variety of combinations of the test-circuits can be produced by simply manipulating the test devices described, there being at least thirty-two different conditions of circuits which can be produced in this arrangement, and while I do not deem it necessary to explain in detail all these various conditions I will explain some of them, so that the use of the apparatus will be clearly understood by those familiar with the art.

We will assume that it is desired to test a metallic circuit from the distributing-frame W toward the switchboard, the plates $w'\,w^6$ representing the terminals on the switchboard side and the plates $w\,w^5$ representing the terminals of the metallic outside circuit. The heat-coils $w^2$ are removed and the test-plugs F and G, which, it will be noticed, are provided on one side with flanges or projections $f$, which serve to hold them in place in the spring-jacks of the protector, as well as to indicate when they are correctly inserted between the springs, are inserted in place of them, and the plunger of the switchboard-testing key M is depressed, thereby connecting the switchboard-plates $w'\,w^6$ in circuit 10 11 through the normally-closed contacts $i^4\,i^5$ of the ringing-key I, thence through the conductors 12 13, including the operator's receiving instrument E, battery-reversing key L, through the normally-closed contacts $l^4\,l^5$ thereof through the movable springs $l^2\,l^3$ thereof by the conductor 18, including the normal contact $k^4$ of the testing-battery key K, and by the conductors 17 and 19 to each side of the secondary coil $d'$ of the inductorium $D'$. If now the plunger of the local-battery key J is operated, the primary circuit through the conductors 14 15, including the transmitting instrument D, the primary coil $d$ of the inductorium $D'$, is closed, thus affording speaking communication between the testing-operator and the switchboard-operator. In order to signal to the switchboard-operator, the ringing-key I is operated, which throws the signal-circuit generator, which is normally connected with the outside springs $i\,i'$, into the circuit of the movable springs $i^2\,i^3$, connected to the conductors 10 and 11, thence to the switchboard side of the test-plugs F and G, and to the switchboard. If no response is received to this signal and no communication can be held with the switchboard-operator, it may be assumed that there is trouble in the conductor or conductors leading to the switchboard or in the switchboard-circuit, and the character of this trouble may be determined by making various tests. For instance, the testing-battery key K may be operated, connecting the battery-conductors 1 and 2 of the way directly with the plugs F and G, and thence to the switchboard, and in doing this it will be noticed that the normal contact $k^4$ is opened, opening the circuit through the secondary coil of the inductorium $D'$, allowing current from the test-battery to go through the operator's receiving-telephone, so that he may more readily detect any abnormal condition of the circuit. If in making this test it is desired to reverse the direction of current, the battery-reversing key L is operated without opening the testing-battery circuit. By manipulating these various keys the character of the fault may be determined by the testing-operator listening at his receiving-telephone instrument.

If in making the test toward the switchboard the circuit is found to be in good condition, the next step is to test the subscriber's-line circuit, and to do this the switchboard-testing key M is opened and the line-testing key N is depressed. This results in connecting the line-terminals, respectively, to the conductors 10 and 11, the movable springs $n^2\,n^3$ being put in contact with the outside springs $n\,n'$, which, as before stated, are permanently connected to the conductors 10 11, and thence to the ringing-key. This being done, the testing-operator can manipulate the ringing-key I, the local-battery key J, the testing-battery key K, the battery-reversing key L, one or more, in various combinations, as before indicated, to determine the character of the fault on the subscriber's circuit.

Supposing instead of a metallic circuit a grounded circuit is to be tested—that is, one on which the ground is used as a return. In that case $w^4$ may represent the conductor extending to the subscriber's station, which is grounded at that station, $w^7$, the conductor extending to the switchboard through the drop, the other side of which latter is permanently grounded, and in this case only one set of spring-plates is used at the protector. The plug F is then inserted in place of the heat-coil $w^2$ and the plug G inserted into the spring P, connected by the conductor 25 to the ground-wire 3 of the way. In order to test toward the switchboard, the key M is depressed, as before, and when this is done the circuit is completed from the ground at the switchboard through the switchboard-conductor $w^7$, plate $w^6$, conductor 22, movable spring $m^3$, outside spring $m'$, conductor 11 to the ringing-key through the normal contacts to conductors 12 and 13, including the operator's receiving and transmitting telephones, as before described, returning through the conductor 10, the outside contact $m$, spring-contact $m^2$, conductor 20, plug G, spring P to the ground-conductor 3. The testing-keys can then be manipulated separately and in combination to determine the character of the fault, if any there be, on the switchboard side of the circuit. If this is found in satisfactory condition, the switchboard-testing key M is released and the line-testing key N is depressed, when the circuit between the subscriber's line and the testing devices is completed in the manner before described and the line can be tested, as above stated.

It is sometimes desirable to loop into a grounded circuit without interrupting it—as, for instance, when the subscriber's line is in use—and to accomplish this I provide a looping-in key O, which is in connection with the test-plug F through conductors 10 and 11, as before described, and when this is done the testing-operator's telephones and any of the testing or ringing keys are in series with the subscriber's circuit and can be operated to test the line in the manner before described. It will be observed that under this condition if the ringing-key is operated the signal will be sent to both ends of the line—that is, to the subscriber's end and the switchboard end—and the same may be said of the testing-battery when the key K is operated.

Of course the battery-reversing key can be operated, as well as the local-battery key, to afford speaking communication with both the subscriber and the operator.

When it is desired to test a metallic circuit without interrupting the same, the plugs F and G being in place, as before described, by depressing the keys M and N, the testing instruments are bridged between the conductors of the metallic circuit. It will be seen that the switchboard sides of the conductors through the test-plugs F and G, are both connected to the conductors 10 and 11, respectively, and the line sides are also both connected to the conductors 10 and 11, thus bridging the testing instrument across the metallic circuit, and by operating the ringing-key the signal will be sent to both terminals of the metallic circuit, and operating the other keys the test-battery or the telephone instruments may be included in the bridge.

In every test-room it is desirable and generally common to have a number of lines connected with the testing or complaint desk. These lines may be connected to the switchboard in the usual way, so that communication can be had with any of the subscribers on their lines, or some of them may connect directly with any official or other party connected with the telephone system, and in order that the operator using my testing apparatus may communicate quickly and readily with these different parties I provide spring-jacks S, suitably and conveniently mounted on the distributing-frame and connected with such lines; also, a double flexible conductor H, having double plugs $Q'$ $Q^2$, one of which is in connection with a spring-jack Q on the testing apparatus and the other of which may be placed in communication with any one of these lines by inserting it in one of the spring-jacks S, and by referring to Fig. 5 it will be seen that the spring-jack Q is in connection with the conductors 10 and 11, which include the ringing-key and the receiving and transmitting telephones.

From the above description the mode of operating my traveling testing device will be clearly understood and the advantages thereof will be apparent to those familiar with this class of work.

It will be seen that the invention, broadly considered, comprises a traveling test apparatus provided with the necessary and desirable testing devices which are adapted to be moved in juxtaposition with the terminals of any line to be tested, the circuits completed between the test devices and the line or different branches thereof, and the test devices operated in any desired order or way in order to determine the faults on the line or any branch thereof, and that the arrangement described is well adapted for the purpose and is a satisfactory embodiment of the invention.

What I claim is—

1. The combination with a way, of a traveling test apparatus mounted on the way comprising a carrier, and a keyboard supporting the test devices, substantially as described.

2. The combination with a traveling test apparatus comprising a carrier and a keyboard supporting the test devices, of conductors supplying current to the test apparatus, and traveling electric connections between said conductors and the test apparatus, substantially as described.

3. The combination with a test apparatus comprising a carrier and keyboard, of conductors for supplying current to the test apparatus, and tubular connections mounted on the conductors and connected to move with the carrier, substantially as described.

4. The combination with a traveling test apparatus comprising a carrier and keyboard, of conductors for supplying current to the test apparatus, tubular connections mounted on the conductors and electrically connected to the test apparatus, and flexible mechanical connections between the tubes and carrier, substantially as described.

5. The combination with a way comprising a series of conductors, of a traveling test apparatus mounted on said way, tubular connections surrounding the conductors and electrically connected to the test apparatus, and springs mechanically connecting the tubes with the test apparatus, substantially as described.

6. The combination with a way comprising a number of conductors, of a traveling test apparatus comprising a carrier and keyboard, insulated rollers connected to the carrier and bearing on the conductors, and traveling electric connections bearing on the conductors and connected to the test apparatus, substantially as described.

7. The combination with a way comprising a number of conductors, of a traveling test apparatus comprising a carrier and keyboard, insulated rollers connected with the carrier and mounted on the conductors, tubes surrounding the conductors and electrically connected to the test apparatus, flexible mechanical connections between the tubes and carrier, and a keyboard supporting the testing devices pivotally connected to the carrier, substantially as described.

8. The combination with a series of conductors, of a traveling test apparatus carrying the test devices comprising the transmitting and receiving telephones and a series of keys, and traveling electric connections between the test devices and conductors, substantially as described.

9. The combination with a distributing-frame having a series of line-terminals, of a series of conductors arranged adjacent said terminals, a traveling test apparatus adapted to move with relation to the terminals, traveling electric connections between the test apparatus and the conductors, test devices on the test apparatus, spring-jacks arranged adjacent the terminals and connected with the switchboard, and plugs arranged to make electric connection with the line-terminals and with the spring-jacks, substantially as described.

In testimony whereof I have signed my name to this specification in the presence of two subscribing witnesses.

EDGAR SPEIDEN, Jr.

Witnesses:
 F. L. FREEMAN,
 PAUL W. STEVENS.